(12) United States Patent
Sakurai

(10) Patent No.: US 10,644,283 B2
(45) Date of Patent: May 5, 2020

(54) BATTERY MODULE

(71) Applicant: HONDA MOTOR CO., LTD., Tokyo (JP)

(72) Inventor: Atsushi Sakurai, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 38 days.

(21) Appl. No.: 15/986,196

(22) Filed: May 22, 2018

(65) Prior Publication Data

US 2019/0013500 A1 Jan. 10, 2019

(30) Foreign Application Priority Data

Jul. 6, 2017 (JP) ................................ 2017-132851

(51) Int. Cl.
| | | |
|---|---|---|
| *H01M 4/02* | (2006.01) | |
| *H01M 2/10* | (2006.01) | |
| *B60L 50/64* | (2019.01) | |
| *H01M 10/04* | (2006.01) | |
| *H01M 2/30* | (2006.01) | |

(52) U.S. Cl.
CPC ........... *H01M 2/1077* (2013.01); *B60L 50/64* (2019.02); *H01M 10/0481* (2013.01); *H01M 10/0486* (2013.01); *B60L 2270/145* (2013.01); *H01M 2/305* (2013.01); *H01M 2220/20* (2013.01)

(58) Field of Classification Search
CPC ....................................................... H01M 4/02
See application file for complete search history.

(56) References Cited

U.S. PATENT DOCUMENTS

| | | |
|---|---|---|
| 2006/0251946 A1 | 11/2006 | Makuta et al. |
| 2009/0297920 A1 | 12/2009 | Yoshitomi et al. |
| 2010/0167115 A1 | 7/2010 | Okada et al. |
| 2014/0349164 A1 | 11/2014 | Park et al. |

(Continued)

FOREIGN PATENT DOCUMENTS

| | | |
|---|---|---|
| JP | 2006-221846 A | 8/2006 |
| JP | 2006-331805 A | 12/2006 |
| JP | 2009-289459 A | 12/2009 |

(Continued)

OTHER PUBLICATIONS

Mar. 19, 2019, Japanese Office Action issued for related JP Application No. 2017-132851.

*Primary Examiner* — Jacob B Marks
(74) *Attorney, Agent, or Firm* — Paratus Law Group, PLLC

(57) ABSTRACT

A battery module includes: a cell stack body that is constituted by a plurality of cells stacked in a front-rear direction and comprises a front surface, a rear surface, a left surface, a right surface, an upper surface, and a lower surface; a pair of end plates that are disposed on the front surface and the rear surface of the cell stack body; and a pair of side frames disposed on the right surface and the left surface of the cell stack body. An end of the end plate and an end of the side frame have an overlapping portion in which the end of the end plate and the end of the side frame overlap with each other when viewed from an up-down direction. The overlapping portion has a through hole passing through in the up-down direction. A connection shaft is inserted into the through hole.

9 Claims, 8 Drawing Sheets

(56) References Cited

U.S. PATENT DOCUMENTS

2016/0013467 A1 1/2016 Kawata et al.
2017/0092911 A1 3/2017 Nishikawa

FOREIGN PATENT DOCUMENTS

| JP | 2010-010010 A | 1/2010 |
| JP | 2012-256466 A | 12/2012 |
| JP | 5405102 B2 | 2/2014 |
| JP | 2014-229615 A | 12/2014 |
| JP | 2016-018766 A | 2/2016 |
| JP | 2017-069004 * | 4/2017 |
| JP | 2017-069004 A | 4/2017 |

* cited by examiner

BATTERY MODULE

CROSS-REFERENCE TO RELATED APPLICATION(S)

This application claims priority from Japanese Patent Application No. 2017-132851 filed on Jul. 6, 2017, the entire contents of which are incorporated herein by reference.

FIELD

The present invention relates to a battery module mounted on an electric vehicle.

BACKGROUND

A battery module has been mounted on an electric vehicle or the like from the related art. For example, the battery module is disclosed in Japanese Patent No. 5405102 and JP-A-2012-256466 which includes a cell stack body formed by a plurality of cells stacked in a front-rear direction and having a front surface, a rear surface, a left surface, a right surface, an upper surface, and a lower surface, a pair of end plates disposed on the front surface and the rear surface of the cell stack body, and a fastening frame for connecting the pair of end plates.

In this type of battery module, a load in a cell stacking direction of the battery module (hereinafter, appropriately referred to as a cell thickness constraint reaction force) occurs due to expansion of the cell caused by temperature change and aging deterioration. In recent years, since more active material is packed in the cell along with the high capacity and the high energy density of the cell, the cell thickness constraint reaction force tends to increase.

The battery module disclosed in Japanese Patent No. 5405102 includes side frames (metal bands) disposed on the right surface and the left surface of the cell stack body, and the side frames respectively include side frame bodies and a front flange portion and a rear flange portion that turn around the front surface and the rear surface of the cell stack body (the end plate) from the side frame body. In such a structure, since a load in a cell stacking direction due to expansion of the cell intensively acts on the front flange portion and the rear flange portion of the side frame, the large generation of bending stress may occur in a connection portion between front flange portion and the side frame body and in a connection portion between the rear flange portion and the side frame body.

In addition, the battery module disclosed in JP-A-2012-256466, is provided with side frames disposed on the right surface and the left surface of the cell stack body, and the front end and a rear end of the side frame are integrally fastened to the left surface and the right surface of the end plate via bolts. In such a structure, since a load in a cell stacking direction due to expansion of the cell intensively acts on the fastening portion of the side frame and the end plate, there may be a problem in that the bolt fastening portion is slipped or transformed.

SUMMARY

The present invention is to provide a battery module capable of preventing generation of bending stress of at a connection portion between an end plate and a side plate.

The invention provides following aspects (1) to (10).

(1) A battery module (e.g., a battery module 1 in an embodiment) including:
  a cell stack body (e.g., a cell stack body 2 in an embodiment) that is constituted by a plurality of cells (e.g., cells 21 in an embodiment) stacked in a front-rear direction and includes a front surface, a rear surface, a left surface, a right surface, an upper surface, and a lower surface;
  a pair of end plates (e.g., end plates 3 in an embodiment) disposed on the front surface and the rear surface of the cell stack body; and
  a pair of side frames (e.g., side frames 4 in an embodiment) disposed on the right surface and the left surface of the cell stack body, wherein
  an end of the end plate and an end of the side frame have an overlapping portion (e.g., an overlapping portion R in an embodiment) in which the end of the end plate and the end of the side frame overlap with each other when viewed from an up-down direction,
  the overlapping portion has a through hole (e.g., through holes 34 and 44 in an embodiment) passing through in the up-down direction, and
  a connection shaft (e.g., a connection shaft 5 in an embodiment) is inserted into the through hole.

(2) The battery module according to (1), wherein the end plate and the side frame are connected rotatably by the connection shaft.

(3) The battery module according to (1) or (2), wherein the connection shaft has a first end, and a second end that is opposite to the first end,
  the first end of the connection shaft includes a locking part (e.g., a locking part 51 in an embodiment) having a diameter bigger than a diameter of the through hole, and
  the second end of the connection shaft is provided with a locking member (e.g., a locking member 52 in an embodiment) having a diameter bigger than the diameter of the through hole.

(4) The battery module according to any one of (1) to (3), wherein
  the end of the end plate includes a plurality of end plate connection portions (e.g., end plate connection portions 32 in an embodiment) spaced apart in the up-down direction,
  the end of side frame includes a plurality of side frame connection portions (e.g., side frame connection portions 42 in an embodiment) spaced apart in the up-down direction, and
  the overlapping portion is constituted such that the end plate connection portions and the side frame connection portions are alternatively overlapped.

(5) The battery module according to any one of (1) to (4), wherein
  the pair of side frames each includes:
    a side frame body (e.g., a side frame body 41 in an embodiment) extending along the right surface or the left surface of the cell stack body and
    the end provided at bath ends of the side frame body, and
  a center (e.g., a center O in an embodiment) of the through hole is disposed on an inner side in a left-right direction than an imaginary line (e.g., an imaginary line L in an embodiment) extending in the front-rear direction along the side frame body.

(6) The batter module according to any one of (1) to (5), wherein
the pair of side frames each includes:
a side frame body (e.g., the side frame body 41 in an embodiment) extending along the right surface or the left surface of the cell stack body and
the end provided at both ends of the side frame body, and
the pair of side frames is constituted such that the side frame bodies are connected to each other by a bridging portion (e.g., a bridging portion 45 in an embodiment) extending in a left-right direction and the up-down direction.

(7) The battery module according to (6), wherein
a width of the bridging portion (e.g., the width W3 in an embodiment) in the front-rear direction is smaller than a width of the side frame (e.g., the width W4 in an embodiment) in the left-right direction.

(8) The battery module according to (6) or (7), wherein the bridging portion is integrally formed in the side frame body.

(9) The battery module according to any one of (1) to (8), wherein
the pair of side frames each includes:
a side frame body (e.g., the side frame body 41 in an embodiment) extending along the right surface or the left surface of the cell stack body; and
the end provided at both ends of the side frame body, and
the side frame body has a projection portion (e.g., a projection portion 41a in an embodiment) extending in the up-down direction between the cells adjacent to each other.

(10) The battery module according to any one of (1) to (9), wherein
the cell stack body includes an external connection terminal (e.g., an external connection terminal 23 in an embodiment), and
the external connection terminal is fixed to the end plate.

According to (1), since the end plate and the side frame are connected by the connection shaft inserted into the through hole formed in the overlapping portion in which theses ends overlap with each other when viewed from the up-down direction, even if a load in the cell stacking direction of the battery module increases due to expansion of the cells caused by temperature change or aging deterioration, the occurrence of bending stress at the connection portion between the end plate and the side plate can be prevented. Therefore, the thickness of the end plate and the side frame can be reduced, and thus the battery module can be reduced in size and weight.

According to (2), since the end plate and the side frame are rotatable connected by the connection shaft, the occurrence of bending stress can be more reliably prevented.

According to (3), since the first end of the connection shaft includes a locking part having a diameter bigger than that of the through hole, and the second end of the connection shaft is provided with a locking member having a diameter bigger than that of the through hole, it is possible to prevent disengagement of the connecting shaft.

According to (4), since the overlapping portion is constituted such that the end plate connection portions and the side frame connection portions are alternatively overlapped, a load in a cell stacking direction can be prevented from acting locally on the connection shaft.

According to (5), since the center of the through hole is disposed on an inner side in a left-right direction than an imaginary line extending in the front-rear direction along the side frame body, overhanging of the connection portion is prevented, and thus the battery module can be reduced in size. In addition, when a load in the cell stacking direction of the battery module is increased, the pair of side frames try to move toward an inner side in the left-right direction. However, the pair of side frames cannot be moved as the cell stack body exists, thereby the force to fix the cell stack body is enhanced.

According to (6), since the pair of side frames is constituted such that the side frame bodies are connected to each other by a bridging portion extending in a left-right direction and the up-down direction, not only the strength of the side frame can be increased but also the bridging portion can be used as a separator of the cell, and thus a number of parts can be reduced.

According to (7), since a width of the bridging portion in the front-rear direction is smaller than a width of the side frame in the left-right direction, it is possible to optimize the thickness of each part according to the applied load, and thereby achieving reduction in size, reduction in weight, and cost reduction of the battery module.

According to (8), since the bridging portion is integrally formed in the side frame body, the number of joining processes can be reduced.

According to (9), since the side frame body is provided with a projection portion extending in the up-down direction between the cells adjacent to each other, vibration in the front-rear direction of the cell can be prevented.

According to (10), since an external connection terminal of the cell stack body is fixed to the end plate where relative movement with respect to the cell stack body is regulated, the distance variation between the cell stack body and the external connection terminal can be regulated.

DETAILED DESCRIPTION

Figure 1:
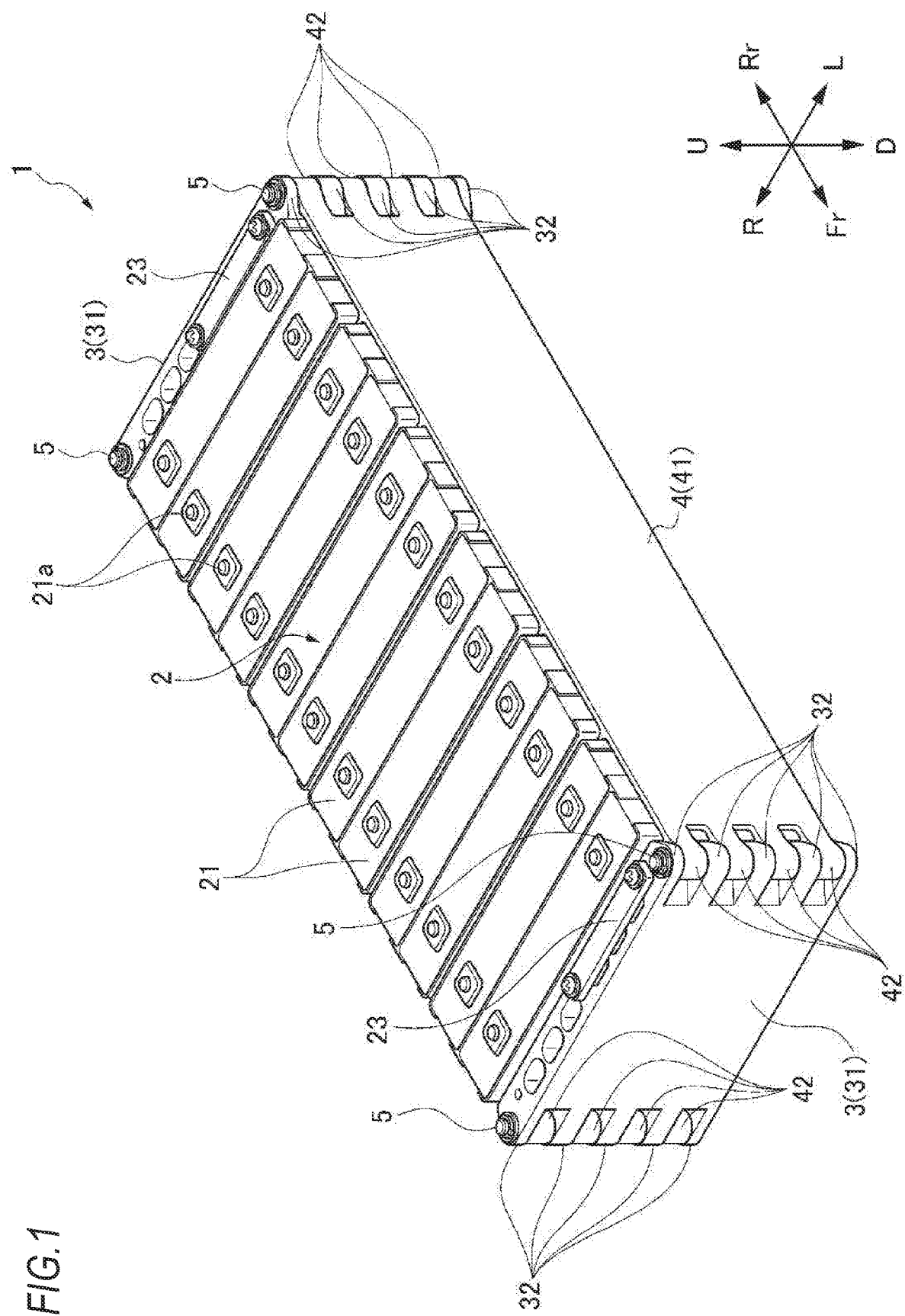
FIG. 1 is a perspective view of a battery module according to a first embodiment of the present invention as viewed obliquely from above.
Figure 2:
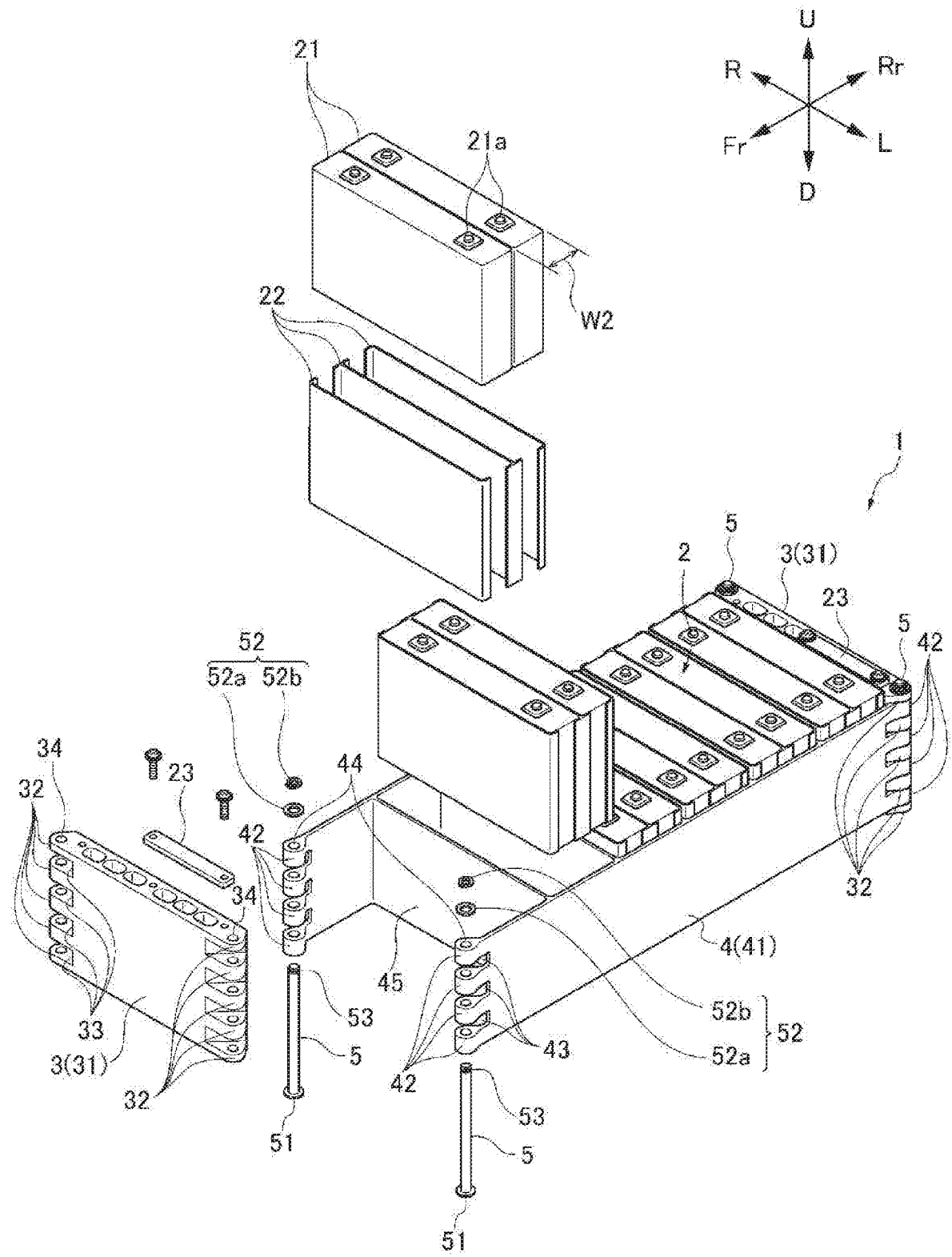
FIG. 2 is an exploded perspective view of the battery module according to the first embodiment of the present invention as viewed obliquely from above.
Figure 3:
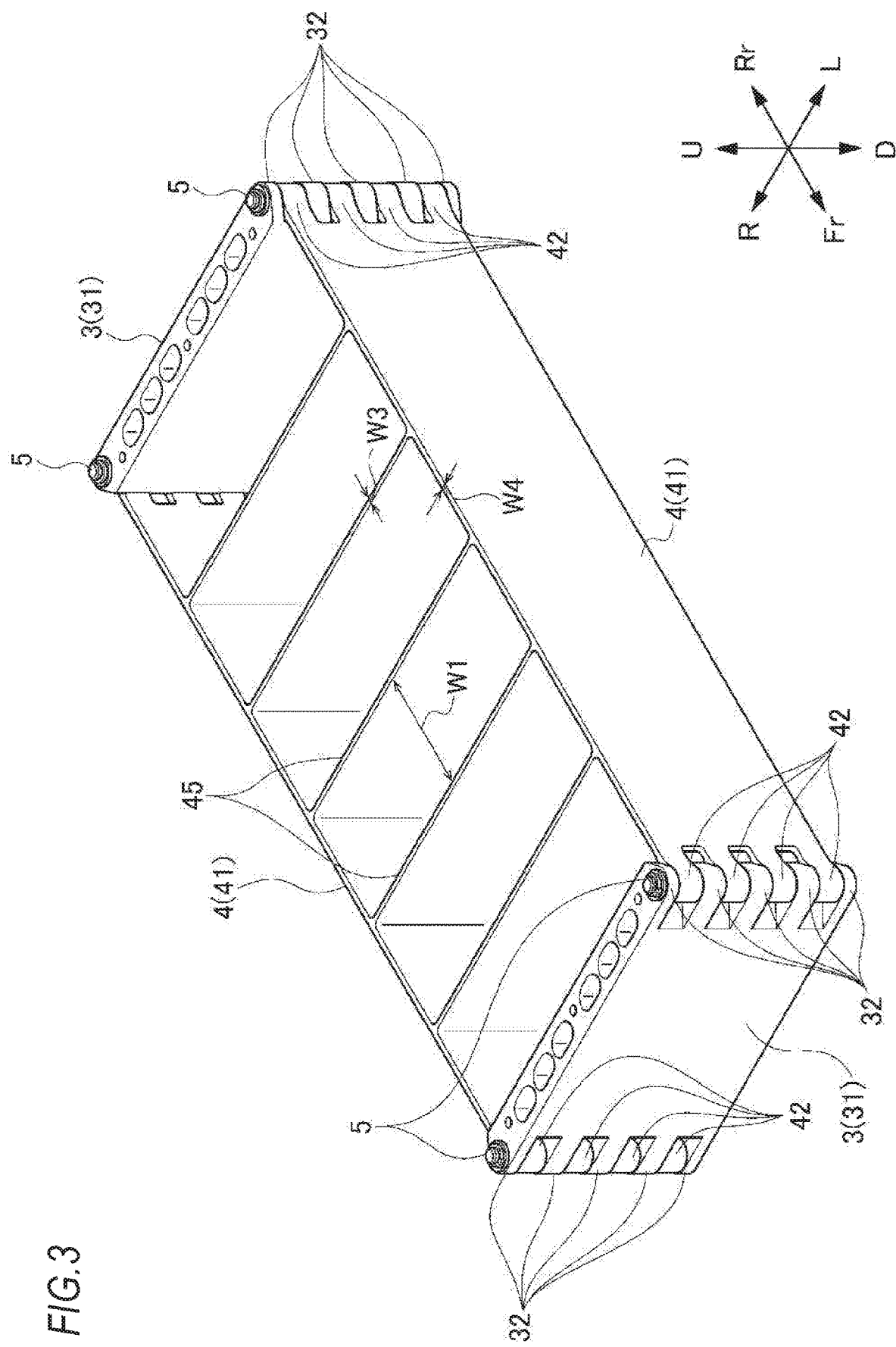
FIG. 3 is a perspective view showing end frames and side frames of the battery module according to the first embodiment of the present invention as viewed obliquely from above.
Figure 4:
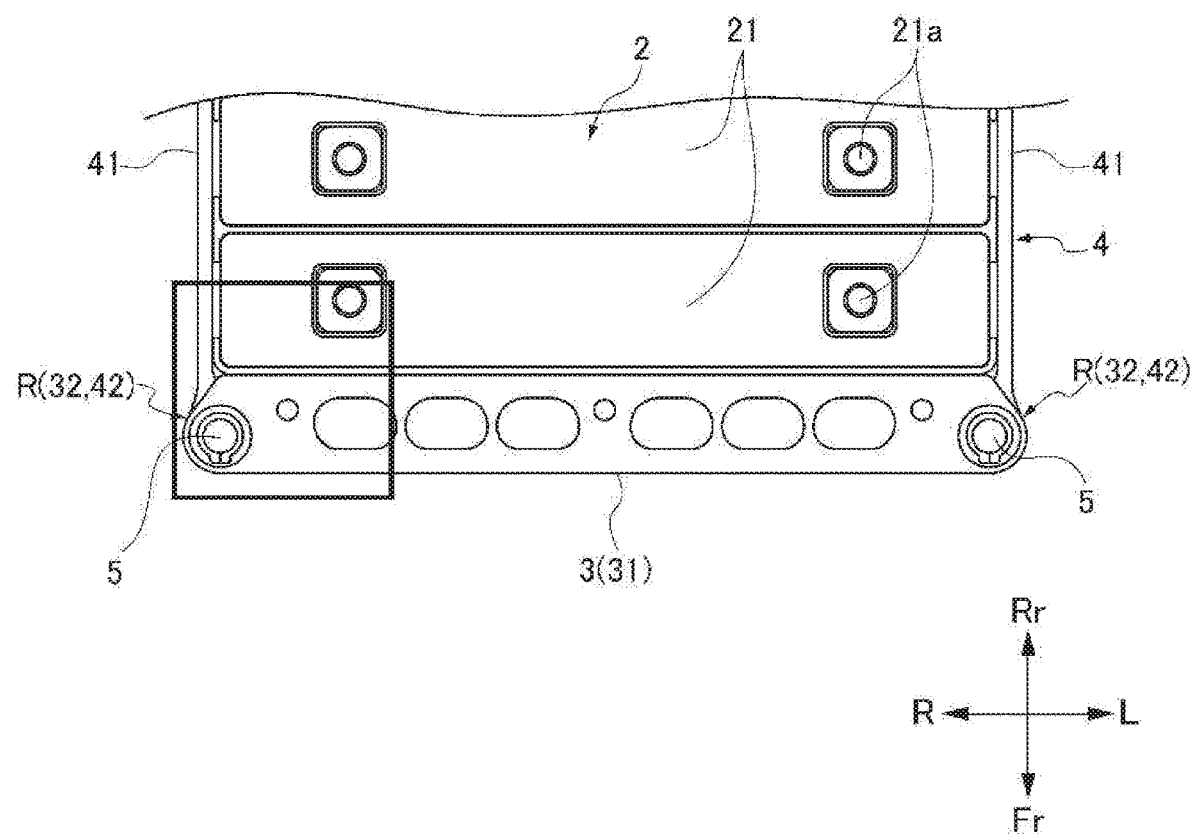
FIG. 4 is a plan view illustrating a main part of the battery module according to the first embodiment of the present invention.
Figure 5:
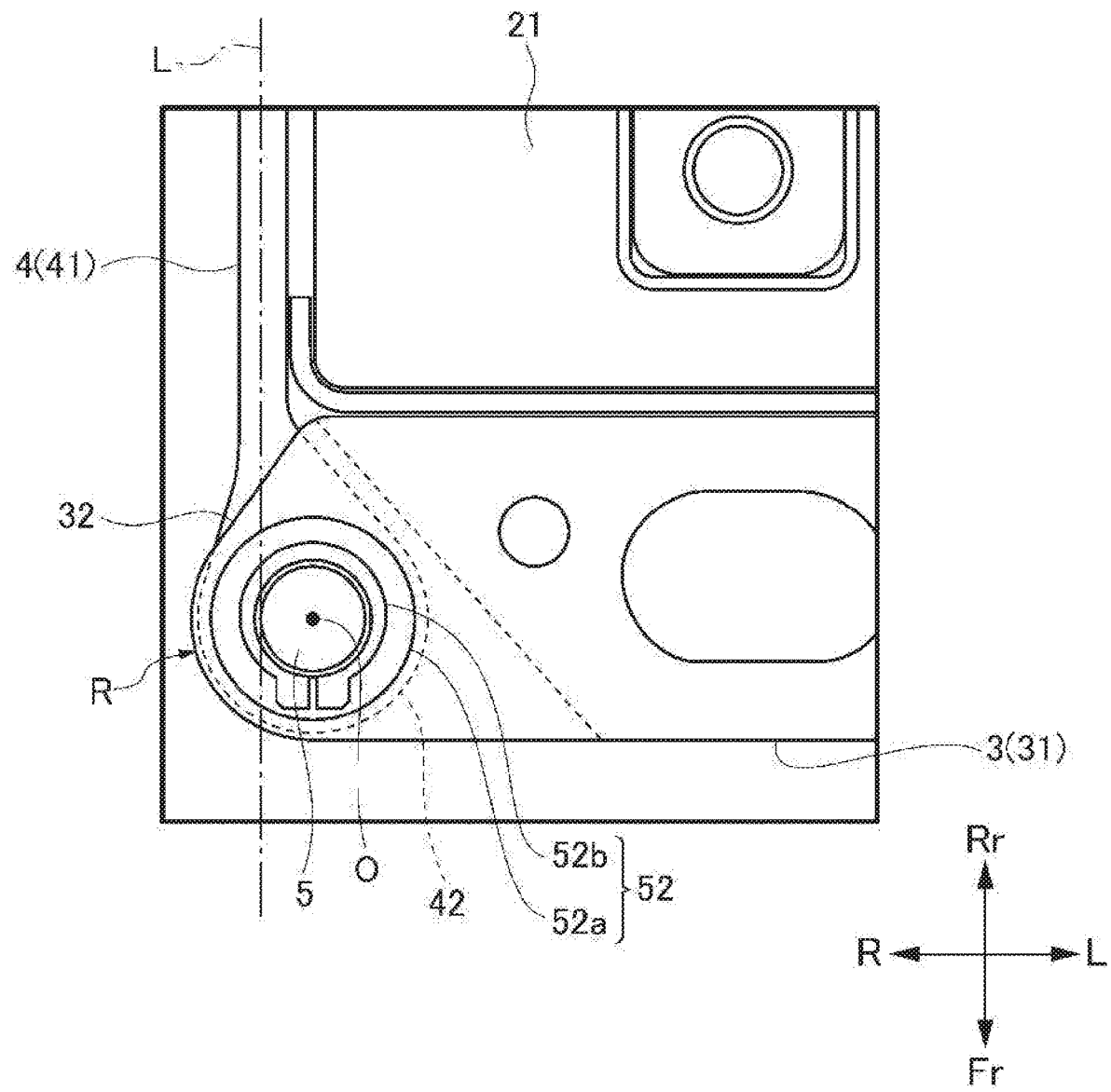
FIG. 5 is an exploded perspective view illustrating a main part of FIG. 4.
Figure 6:
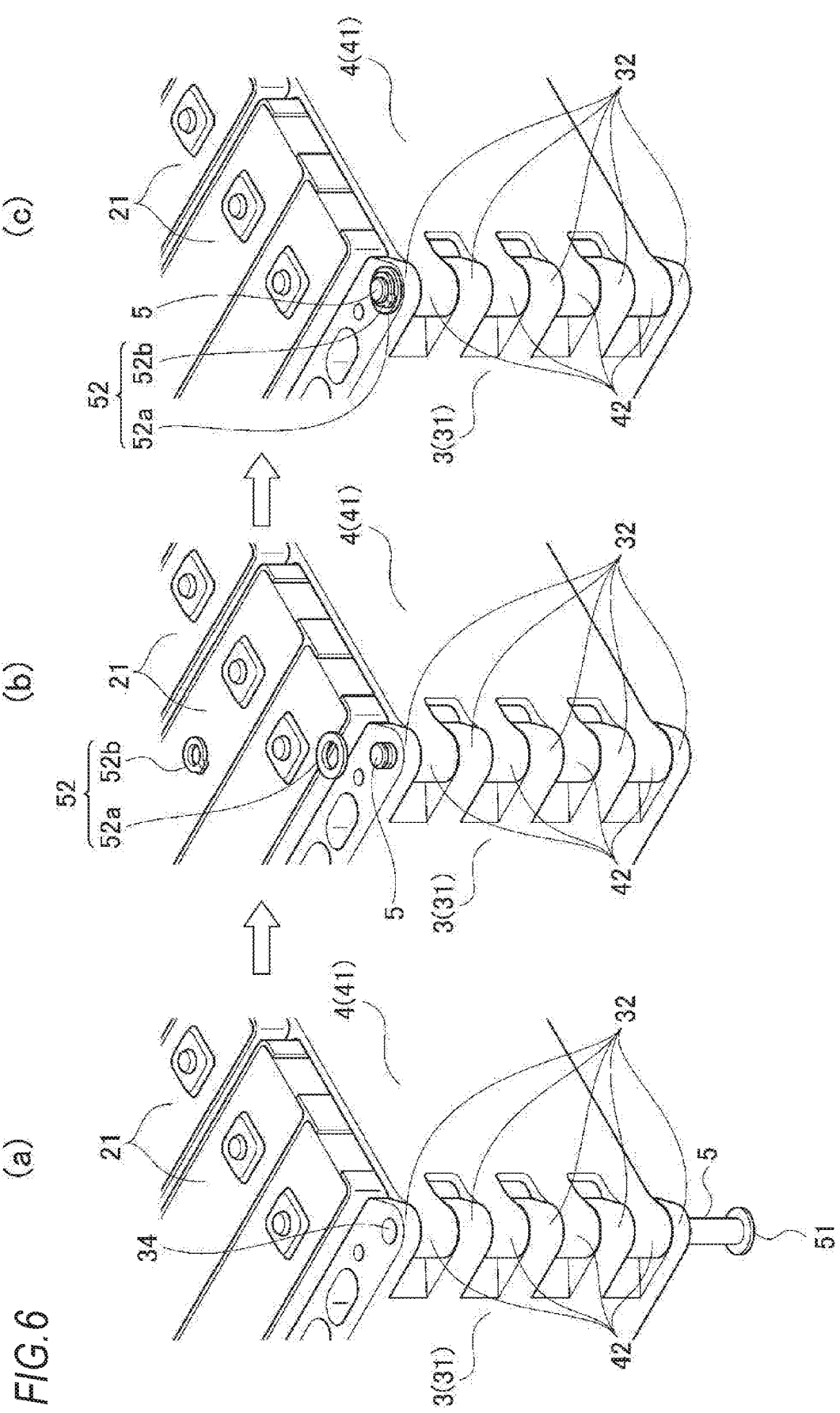
FIG. 6 is a view of a connection process of the a end plate and a side frame of the battery module according to the first embodiment of the present invention, wherein (a) is a perspective view showing an insertion process of a connection shaft, (b) is a perspective view showing an installation process of a washer and a clip, and (c) is a perspective view showing a status after the connection process.

Battery modules according to embodiments of the present invention will be described with reference to the accompanying drawings. It is noted that the drawings are to be viewed in directions of reference numerals.

First Embodiment

As illustrated in FIGS. 1 to 6, a battery module 1 according to a first embodiment of the present invention is constituted by a cell stack body 2 in which a plurality of cells 21 are stacked in a front-rear direction, and which includes a front surface, a rear surface, a left surface, a right surface, an upper surface, and a lower surface, a pair of end plates 3 disposed on the front and rear surfaces of the cell stack body 2, a pair of side frames 4 disposed on the left and right surfaces of the cell stack body 2, and a plurality of connection shafts 5 for connecting between end plates 3 and side frame 4.

For the simple and clear description in this specification, a stacking direction of the cells 21 is defined as a front-rear direction, a direction orthogonal to the stacking direction of the cells 21 is defined as a left-right direction and an up-down direction, and the stacking direction is irrelevant to a front-rear direction or the like of products on which the battery module 1 is mounted. That is, when the battery module 1 is mounted on a vehicle, the stacking direction of the cells 21 may be aligned with a front-rear direction of the vehicle, may be an up-down direction and a left-right direction of the vehicle, or may be inclined with respect to these directions. In the drawings, a front side, a rear side, a left side, a right side, an upper side, and a lower side of the battery module 1 are indicated by Fr, Rr, L, R, U, and D, respectively.

(Cell Stack Body)

The cell stack body 2 is formed by a plurality of the cells 21 and a plurality of insulation member 22 which are alternately stacked in the front-rear direction. The pair of the end plates 3 are disposed on the front and rear surfaces of the cell stack body 2 in an insulation state via the insulation members 22, and the pair of side frames 4 are disposed on the left and right surfaces of the cell stack body 2 in an insulation state via a slight gap therebetween.

It is known that the cell 21 expands due to temperature change or aging deterioration. The cell 21 has a rectangular parallelepiped shape in which a length in the up-down direction is longer than a length in the front-rear direction, and a length in the left-right direction is longer than a length in the up-down direction. Therefore, the front surface and the rear surface of the cell 21 have a much larger area than the left surface, the right surface, the upper surface, and the lower surface, and the front surface and the rear surface of the cell 21 easily expand at a central part in the left-right direction and a central part in the up-down direction thereof.

A plurality of bus-bars (not illustrated) are disposed on the upper surface of the cell stack body 2 to be electrically connected to terminals 21a of the cells 2. As the bus-bars, there are bus-bars for connecting the terminals 21a of the cells 21 with each other or bus-bars for connecting the terminals 21a of the cells 21 with external connection terminals (not illustrated). When the position of the terminal 21a of the cell 21 and the external connection terminal 23 are relatively changed, connection failure may occur. Therefore, it is necessary to fix the external connection terminal 23 at a position where the position of the external connection terminal relative to the terminal 21a of the cell 21 does not relatively change. In the present embodiment, the external connection terminal 23 is fixed to the end plate 3, and movement of the end plate 3 is prevented based on a connection structure of the side frame 4 to be described below.

(End Plate)

The pair of the end plates 3 respectively contact with the front surface and the rear surface of the cell stack body 2 through the insulation member 22, and receive a load in the cell stacking direction of the cell stack body 2 (hereinafter, also referred to as a cell thickness constraint reaction force as appropriate). The load in the cell stacking direction of the cell stack body 2 is mainly caused by expansion of the cells 21 due to temperature change or aging deterioration, and since the front surface and the rear surface of the cell 21 easily expand at the central part in the left-right direction and the central part in the up-down direction thereof as described above, a large load is applied to a central part in the left-right direction and a central part in the up-down direction of the end plate 3.

The end plate 3, for example, is formed using an aluminum extrusion material, and integrally includes an end plate body 31 extending along the front surface and the rear surface of the cell stack body 2 and end plate connection portions 32 connected to the side frame 4 by the connection shafts 5 provided in the left and right end of the end plate body 31. A plurality of end plate connection portions 32 are provided at the left and right ends of the end plate body 31 via a predetermined gaps 33 interposed in the up-down direction. Each of the end plate connection portion 32 is formed with a through hole 34 passing through in the up-down direction.

(Side Frame)

The pair of side frames 4 are formed using, for example, an aluminum extrusion material. The side frame 4 integrally include a side frame body 41 extending along the left surface or the right surface of the cell stack body 2 and side frame connection portions 42 connected to the end plate 3 by the connection shaft 5 provided at both front and rear end portions of side frame body 41. A plurality of side frame connection portions 42 are provided at both front and rear mid portions of side frame body 41 via a predetermined gap 43 in the up-down direction, and each of the side frame connection portions 42 is provided with a through hole 44 penetrating in the up-down direction. As illustrated FIG. 5, a center O of the through hole 44 is disposed on an inner side in the left-right direction from an imaginary line L extending in the front-rear direction along the side frame connection portion 42.

In the pair of side frames 4, the side frame bodies 41 are connected to each other by bridging portions 45 extending in the left-right direction and the up-down direction. A plurality of bridging portions 45 (for example, five bridging portions) are provided with predetermined distances W1 in the front-rear direction. Thus, the rigidity of the side frame 4 is enhanced.

The distance W1 between the bridging portions 45 adjacent to each other is larger than a width W2 in the front-rear direction of the cell 21. In the present embodiment, for example, the distance W1 between the bridging portions 45 adjacent to each other is larger than twice the width W2 in the front-rear direction of the cell 21, and two of the cells 21 are accommodated between the bridging portions 45 adjacent to each other. Thus, the side frame 4 is also used as a separator member for separating the cells 21 from each other, whereby the number of parts can be reduced.

The width W3 in the front-rear direction of the bridging portion 45 is smaller than a width W4 in the left-right direction of the side frame body 41. Thus, it is possible to optimize the thickness of each part according to the applied load, thereby achieving reduction in size, reduction in weight, and cost reduction of the battery module 1.

The bridging portion 45 is formed integrally with the side frame body 41. Thus, a process of joining the side frame body 41 to the bridging portion 45 is not necessary, and the number of joining processes can be reduced. However, the bridging portion 45 is not limited to being formed integrally with the side frame body 41, and may be formed separately from the side frame body 41 and then joined to the side frame body 41.

[Connection Shaft]

The connection shaft 5 is inserted in the up-down direction into the through holes 34 and 44 at an overlapping portion R where the end plate connection portions 32 of the end plate 3 and the side frame connection portions 42 of the side frame 4 overlap with each other as viewed in the up-down direction, and thus the end plate 3 and the side frame 4 are connected to each other. The plurality of end plate connection portions 32 formed on the end plate 3 and the plurality of side frame connection portions 42 formed on the side frame 4 alternately enter into a plurality of gaps 33 and 43 formed in the other side, thereby forming the overlapping portion R to overlap with each other as viewed in the up-down direction. According to the connection structure between the end plate 3 and the side frame 4 via the connection shaft 5, even if a load in a cell stacking direction of the battery module 1 increases due to expansion of cell 21, it is possible to prevent the occurrence of bending stress at the connection portion between the end plate 3 and side frame 4.

The connection shaft 5 connects the end plate 3 and the side frame 4 in a state of allowing relative rotation (turning) therebetween. More specifically, as illustrated FIGS. 2 and 6, the connection shaft 5 of the present embodiment includes a locking portion 51 having a diameter larger than the diameter of the through holes 34 and 44 at one end thereof, and is provided with a locking member 52 having a diameter larger than the diameter of the through holes 34 and 44 at the other end thereof. The locking member 52 of the present embodiment includes a washer 52a mounted on the other end of the connection shaft 5 and a snap ring 52b mounted into a groove 53 formed at the other end of the connection shaft 5 so as not to be movable in the up-down direction, and prevents the connection shaft 5 from coming off in a state where the relative rotation between the end plate 3 and the side frame 4 is allowed. According to the connection structure between the end plate 3 and the side frame 4 through the connection shaft 5 in this way, it is possible to reliably prevent the occurrence of bending stress at the connection portion between the end plate 3 and the side frame 4.

As described above, according to the battery module 1 of the present embodiment since the end plate 3 and the side frame 4 are connected to each other through the connection shaft 5 inserted into the through holes 34 and 44 formed in the overlapping portion R to overlap with each other as viewed in the up-down direction, even if a load in the cell stacking direction of the battery module 1 increases due to expansion of the cells 21 caused by temperature change or aging deterioration, the occurrence of bending stress at the connection portion between the end plate 3 and the side plate 4 can be prevented. Therefore, the wall thickness of the end plate 3 and the side frame 4 can be reduced, and the battery module 1 can be reduced in size and weight.

In addition, since the end plate 3 and the side frame 4 are rotatably connected by the connection shaft 5, the occurrence of bending stress can be more reliably prevented.

Further, since the connection shaft 5 includes the locking portion 51 having a diameter lager than the diameter of the through holes 34 and 44 at the one end thereof and is provided with the locking member 52 having a diameter than the diameter of the through holes 34 and 44 at the other end thereof, it is possible to prevent the connecting shaft 5 from coining off while allowing the end plate 3 and the side frame 4 to rotate.

In addition, since the overlapping portion R is formed by overlapping the plurality of the end plate connection portions 32 and the plurality of the side frame connection portions 42, the load in the cell stacking direction can be prevented from acting locally on the connection shaft 5.

In addition, since the center O of the through hole 44 is disposed on the inner side in the left-right direction from the imaginary line L in extending in the front-rear direction along the side frame body 41, the side frame connection portion 42 can be prevented from overhanging and the battery module 1 can be reduced in size.

In addition, when the load in the cell stacking direction of the battery module 1 increases, the pair of side frames 4 try to move toward the inner side in the left-right direction, but cannot move because the cell stack body 2 exists, and thus the force to fix the cell stack body 2 is enhanced.

In addition, since the side frame bodies 41 of the pair of side frames 4 are connected to each other by the bridging portion 45 extending in the left-right direction or the up-down direction, not only the strength of the side frame 4 can be increases but also the bridging portion 45 can be used as a separator of the cell 21, whereby the number of parts can be reduced.

Further, since the width W3 in the front-rear direction of the bridging portion 45 is smaller than the width W4 in the left-right direction of the side frame body 41, it is possible to optimize the thickness of each portion according to the applied load, thereby achieving reduction in size, reduction in weight, and cost reduction of the battery module 1.

In addition, since the bridging portion 45 is formed integrally with the side frame body 41, the number of joining processes can be reduced.

In addition, since the external connection terminal 23 of the cell stack body 2 is fixed to the end plate 3 where relative movement with respect to the cell stack body 2 is regulated, the distance variation between the cell stack body 2 and the external connection terminal 23 can be regulated.

Second Embodiment

A battery module according to a second embodiment of the present invention will be described below with reference to FIG. 7. However, only the differences from the first embodiment will be described, and the configuration of common to the first embodiment will be denoted by the same reference numerals as in the first embodiment, so that the description of the first embodiment will be adopted.

Figure 7:
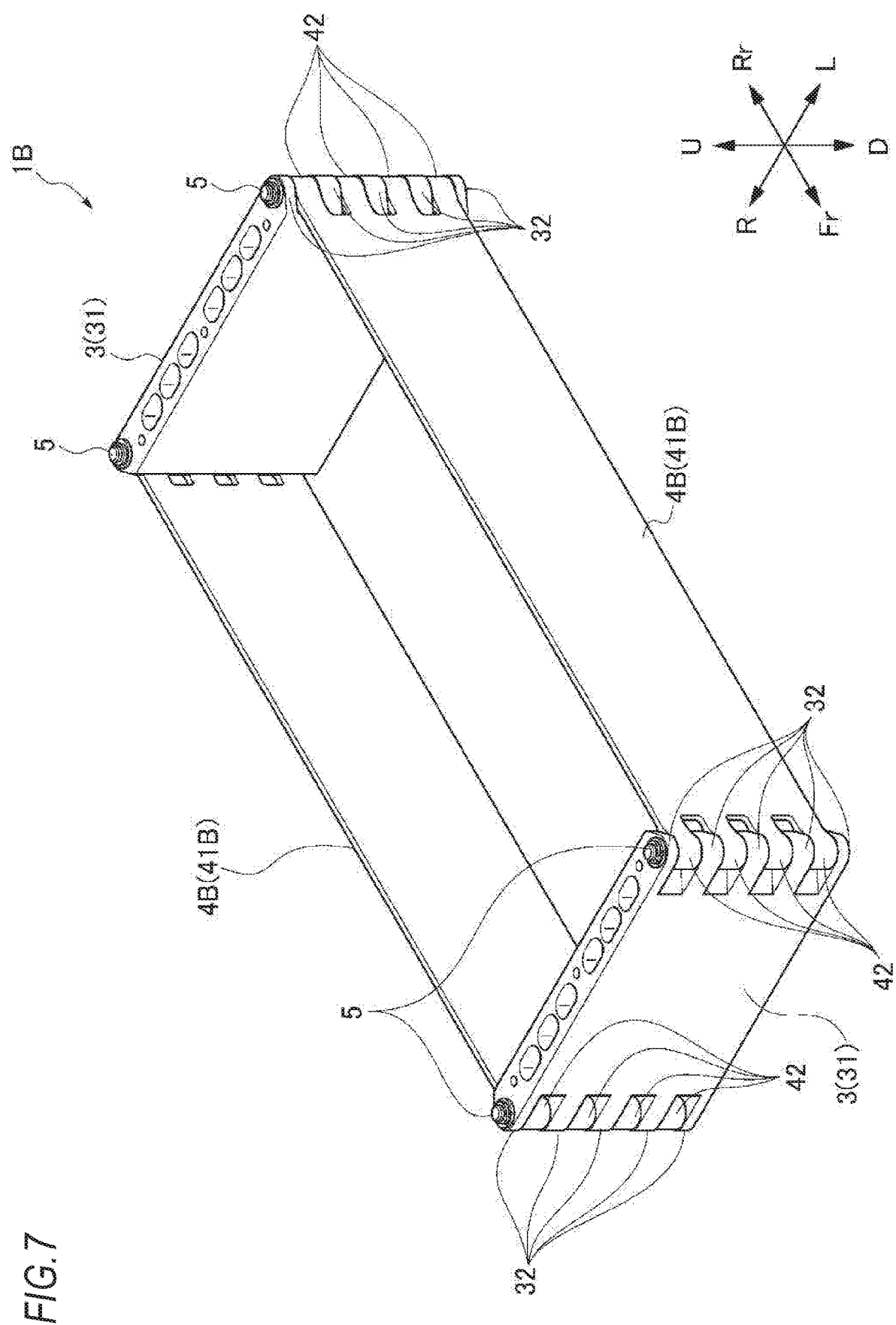
FIG. 7 is a perspective view illustrating an end plate and the side frame of a battery module according to a second embodiment of the present invention.

As illustrated in FIG. 7, a battery module 1B according to a second embodiment differs from that of the first embodiment in that the bridging portion for connecting side frame bodies 41B of a pair of side frames 4B is not presented and the pair of side frames 4B are formed as separate members separated from each other.

Third Embodiment

Figure 8:
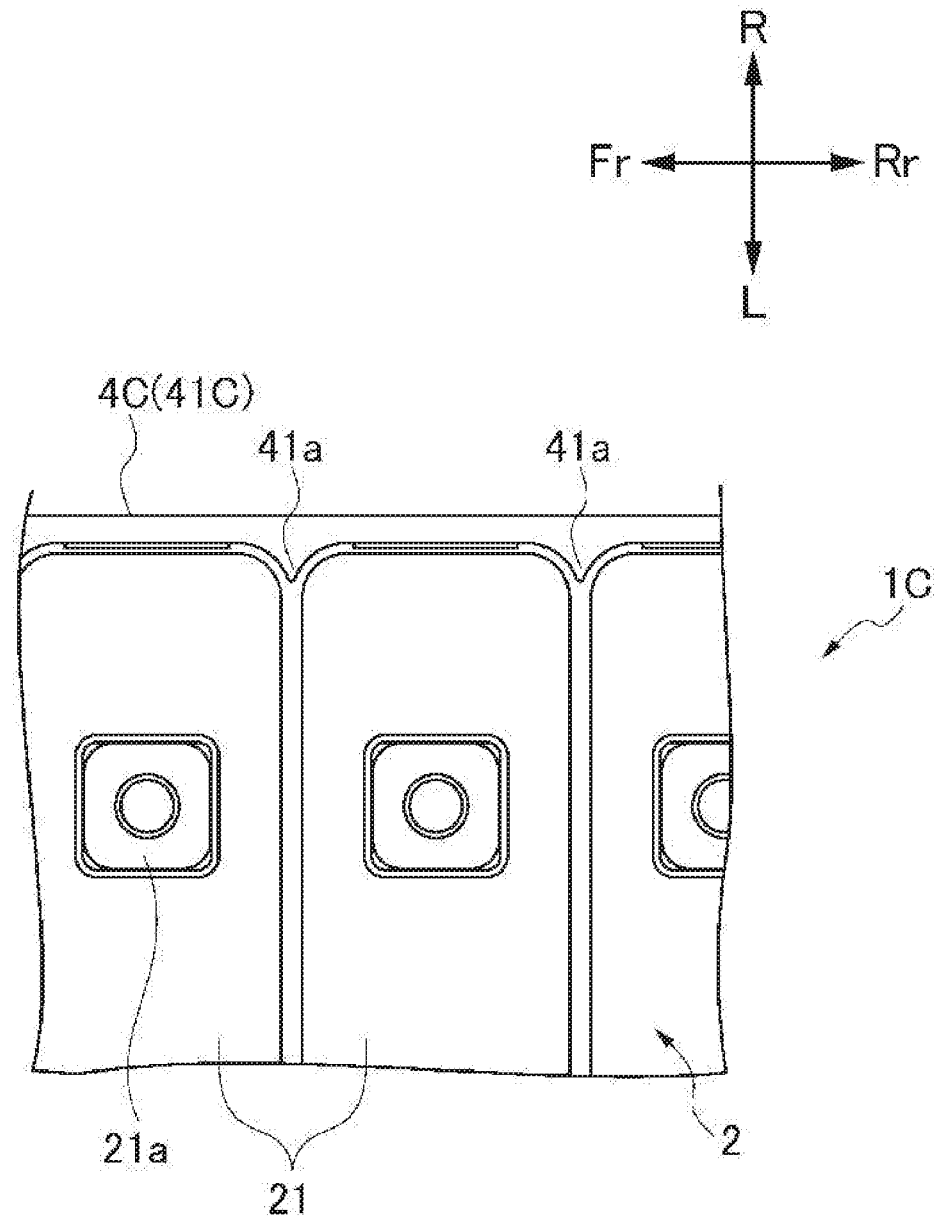
FIG. 8 is a plan view illustrating a main part of a battery module according to a third embodiment of the present invention.

As illustrated in FIG. 8, a battery module 1C according to a third embodiment differs from that of the first embodiment in that a side frame body 41C of a side frame 4C is provided with a plurality of projections 41a extending in an up-down direction between cells 21 adjacent to each other. For example, as illustrated in FIG. 8, the projection portion 41a has a shape conforming to a shape of a corner of the cells 21 adjacent to each other, and is engaged with the cell 21 in the front-rear direction. According to the battery module 1C of the third embodiment, vibration in the front-rear direction of the cell 21 can be prevented by the plurality of projections 41a provided in the side frame body 41C of the side frame 4C.

It is noted that the present invention is not limited to the above-described embodiments, but can be appropriately modified and improved.

The invention claimed is:

1. A battery module comprising:
a cell stack body that is constituted by a plurality of cells stacked in a front-rear direction and comprises a front surface, a rear surface, a left surface, a right surface, an upper surface, and a lower surface;
a pair of end plates disposed on the front surface and the rear surface of the cell stack body; and
a pair of side frames disposed on the right surface and the left surface of the cell stack body, wherein
an end of the end plate and an end of the side frame have an overlapping portion in which the end of the end plate and the end of the side frame overlap with each other when viewed from an up-down direction,
the overlapping portion has a through hole passing through in the up-down direction,
a connection shaft is inserted into the through hole,
the end of the end plate comprises a plurality of end plate connection portions spaced apart in the up-down direction,
the end of side frame comprises a plurality of side frame connection portions spaced apart in the up-down direction, and
the overlapping portion is constituted such that the end plate connection portions and the side frame connection portions are alternatively overlapped.

2. The battery module according to claim 1, wherein the end plate and the side frame are connected rotatably by the connection shaft.

3. The battery module according to claim 1, wherein the connection shaft has a first end, and a second end that is opposite to the first end,
the first end of the connection shaft comprises a locking part having a diameter bigger than a diameter of the through hole, and
the second end of the connection shaft is provided with a locking member having a diameter bigger than the diameter of the through hole.

4. The battery module according to claim 1, wherein the pair of side frames each comprises:
a side frame body extending along the right surface or the left surface of the cell stack body; and
the end provided at both ends of the side frame body, and
a center of the through hole is disposed on an inner side in a left-right direction than an imaginary line extending in the front-rear direction along the side frame body.

5. The battery module according to claim 1, wherein the pair of side frames each comprises:
a side frame body extending along the right surface or the left surface of the cell stack body; and
the end provided at both ends of the side frame body, and
the pair of side frames is constituted such that the side frame bodies are connected to each other by a bridging portion extending in a left-right direction and the up-down direction.

6. The battery module according to claim 5, wherein a width of the bridging portion in the front-rear direction is smaller than a width of the side frame in the left-right direction.

7. The battery module according to claim 5, wherein the bridging portion is integrally formed in the side frame body.

8. The battery module according to claim 1, wherein the pair of side frames each comprises:
a side frame body extending along the right surface or the left surface of the cell stack body; and
the end provided at both ends of the side frame body, and
the side frame body has a projection portion extending in the up-down direction between the cells adjacent to each other.

9. The battery module according to claim 1, wherein the cell stack body comprises an external connection terminal, and
the external connection terminal is fixed to the end plate.

* * * * *